United States Patent
Speyer et al.

(10) Patent No.: US 8,032,932 B2
(45) Date of Patent: Oct. 4, 2011

(54) SYSTEMS AND METHODS FOR PROVIDING SECURITY TOKEN AUTHENTICATION

(75) Inventors: Jerry Speyer, Tampa, FL (US); Sandeep Nair, Riverview, FL (US); Ricky Luo, Berkeley Heights, NJ (US)

(73) Assignee: Citibank, N.A., New York, NY (US)

( * ) Notice: Subject to any disclaimer, the term of this patent is extended or adjusted under 35 U.S.C. 154(b) by 544 days.

(21) Appl. No.: 12/196,526

(22) Filed: Aug. 22, 2008

(65) Prior Publication Data

US 2010/0050251 A1 Feb. 25, 2010

(51) Int. Cl.
G06F 7/04 (2006.01)
G06F 17/30 (2006.01)
H04L 29/06 (2006.01)
G06F 15/16 (2006.01)

(52) U.S. Cl. .............................. 726/9; 726/20
(58) Field of Classification Search ................. 726/9, 20
See application file for complete search history.

(56) References Cited

U.S. PATENT DOCUMENTS

| | | | |
|---|---|---|---|
| 7,516,483 B2 * | 4/2009 | Brennan | 726/9 |
| 2001/0045451 A1 * | 11/2001 | Tan et al. | 235/375 |
| 2003/0191711 A1 * | 10/2003 | Jamison et al. | 705/40 |
| 2004/0059952 A1 * | 3/2004 | Newport et al. | 713/202 |
| 2004/0250118 A1 * | 12/2004 | Andreev et al. | 713/201 |
| 2005/0033703 A1 * | 2/2005 | Holdsworth | 705/67 |
| 2005/0149759 A1 * | 7/2005 | Vishwanath et al. | 713/201 |
| 2005/0166263 A1 * | 7/2005 | Nanopoulos et al. | 726/7 |
| 2007/0016943 A1 * | 1/2007 | M'Raihi et al. | 726/9 |
| 2007/0022196 A1 * | 1/2007 | Agrawal | 709/225 |
| 2007/0186106 A1 * | 8/2007 | Ting et al. | 713/168 |
| 2008/0228653 A1 * | 9/2008 | Holdsworth | 705/67 |
| 2009/0055907 A1 * | 2/2009 | Van Horn | 726/6 |

* cited by examiner

*Primary Examiner* — Michael Simitoski
(74) *Attorney, Agent, or Firm* — Johnson & Associates

(57) ABSTRACT

Described herein are systems and methods for centralizing and standardizing implementation of security tokens so as to provide one token per one user for accessing business applications across an enterprise, providing scalability to support authentication of as many enterprise users as desired or needed, and providing a standardized token management interface that supports both pre-binding and post-binding user registration processes and different types of security token.

17 Claims, 9 Drawing Sheets

SYSTEMS AND METHODS FOR PROVIDING SECURITY TOKEN AUTHENTICATION

BACKGROUND

The Federal Financial Institutions Examination Council (FFIEC) required all financial institutions to support multi-factor authentication (MFA) for accessing Internet-facing applications that hold personal data by Dec. 31, 2006. As refers herein and understood in the art, MFA refers to the requirement for accessing an information technology (IT) system, application, or service with at least two different methods or factors of authentication. As also referred herein and understood in the art, IT encompasses all forms of technology, including but not limited to the design, development, installation, and implementation of hardware and software information or computing systems and software applications, used to create, store, exchange and utilize information in its various forms including but not limited to business data, conversations, still images, motion pictures and multimedia presentations technology and with the design, development, installation, and implementation of information systems and applications.

Accordingly, MFA delivers a higher level of authentication assurance as opposed to single-factor authentication, wherein an individual needs only one type of authentication to show access authorization to an IT system, application, or service. To adhere to the FFIEC-mandated MFA, financial institutions have implemented multiple authentication mechanisms such as passwords or personal identification numbers (PINs), biometric identifications, and the ubiquitous security tokens. As referred herein and understood in the art, a security token may be a hardware or software security token. A hardware security token includes credentials, such as one-time passwords (OTPs) stored in a dedicated physical device to aid an individual with user authentication to access an IT system, application, or service. Examples of hardware security tokens with OTPs include but are not limited to Safeword™ tokens by Secure Computing Corporation™, SecurID™ tokens by RSA™, and Digipass™ tokens by VASCO™. Unlike a hardware security token, a software security token include credentials that may be stored on a general-purpose device, such as a computer, mobile phone, or personal digital assistant (PDA), to aid the individual with user authentication to access an IT system, application, or service. The same credentials that are stored in a hardware security token may be software implemented as a software token stored in a general-purpose device.

As referred herein, an enterprise may be a company, a corporation, or any other organization or business entity. Large business enterprises, such as large financial institutions, with multiple business units or divisions therein typically implement different types of security tokens for different business units, based on the preferences of the later. For example, while a foreign exchange (FX) business unit of a financial institution may offer RSA SecurID™ tokens to individuals authorized to access the FX systems and applications via the Internet, a commodity exchange business unit of the same financial institution may offer VASCO Digipass™ tokens to individuals authorized to access its commodity exchange systems and applications via the Internet. The authorized individuals may be employees or customers of the enterprise or one of its business units or any other users authorized to access the enterprise's system or business applications therein. As referred herein, a business application is an application that is hosted by a business unit, and such application may be a financial application, an IT application, an engineering application, or any other application as desired to be hosted by the business unit, depending on the type of business unit or the type of the enterprise to which the business unit belongs.

SUMMARY

There are a number of issues with the aforementioned conventional token implementation. First, because each business unit implements its security token solution, the security tokens cannot be shared across the enterprise and between business applications therein. This may raise audit or compliance issues as there is no standard token implementation for each token deployment. Second, due to the different types of security tokens implemented for different business units, IT support for security tokens is not centralized and becomes more expensive for the enterprise as each of its business units needs to duplicate the token domain and support functions for its own type of security tokens. The added cost also may prohibit each business unit to offer more than one type of security tokens to authorized individuals. Consequently, each business unit has to decide which type of security tokens to deploy for its entire customer population, regardless of the token preference of each customer. Third, the conventional security token architecture is not scalable because each token domain operates as a separate token infrastructure. Because each business unit or application can only point to one token domain for user authentication, problems arise when such unit or application needs to support more users than the underlying token infrastructure can support. Fourth, authorized individuals need to have multiple tokens to access multiple business applications, especially when such applications belong to different business units. That is because tokens cannot be shared between applications if applications are not configured to point to the same token domain for authentication. Consequently, the requirement to have multiple tokens may negatively impact the "user experience" of authorized individuals, such as the enterprise customers, with the enterprise and affect the enterprise's business.

Thus, there is a desire by business enterprises to achieve the goal of "one token per one customer" so as to increase the customer satisfaction and experience and to reduce operating costs with less issued tokens and a more-simplified token infrastructure and supporting functions. To further increase customer satisfaction and reduce support cost, business enterprises also desire the ability to offer different types of tokens to different users within each business unit, depending on the user preferences or geographical location. For example, customers in one geographical region may be more familiar with one specific type of security token and therefore would want to use that token type with less support cost (for example, less customer-service calls on how to operate unfamiliar tokens).

Accordingly, described herein are token systems and methods for centralizing and standardizing implementation of security tokens (also hereinafter, "tokens") so as to provide one token per one user of an enterprise to reduce operating costs, and the user may employ a single token to access applications across the enterprise. These token systems and methods are scalable to support as many enterprise users as desired or needed. In various embodiments described herein, there is also provided a token management interface (TAMIN) for the information security administration (ISA) and business helpdesks to administer users and tokens, with support for both pre-binding and post-binding token registration processes. The TAMIN may include a web-based application having application programming interfaces (APIs) so that its functions may be integrated into business applications. Also, an enterprise is provided with a centralized and standardized authentication interface for all business applications across the enterprise, with supports for multiple types of tokens for authentication.

In one embodiment, there is provided a system for authenticating a security token provided to request access to at least one business application in an enterprise, comprising: a plurality of token domains each token domain operates to authenticate a type of security token; a lookup database that stores therein a mapping of security tokens to token types and the plurality of token domains; a token management interface that operates to register the provided security token by creating a user profile that includes the provided security token, a token type of the provided security token as provided by the mapping in the lookup database, and a corresponding one of the token domains as also provided by the mapping in the lookup database; a user store database that operates to store the user profile; and an authentication broker that operates to receive the provided security token from the at least one business application and to look up the provided security token in the user profile stored in the user store database to identify the token type and the corresponding token domain of the provided token so as to authenticate the provided security token.

In another embodiment, there is provided a method for authenticating a request to access at least one business application in an enterprise, comprising: receiving a request for a security token for authenticating the request to access the at least one business application; creating a unique user identification (UID) for the security-token request; assigning and activating a security token in response to the security-token request, the security token is identified by a unique token identification; looking up the assigned security token and its unique token identification to identify a token type of the assigned security token and an associated token domain for authenticating the assigned security token; storing the UID, the unique token identification, the identified token type, and an identification of the associated token domain in a user profile; receiving the request to access the at least one business application, wherein the request includes the assigned and activated security token; responsive to the request to access, looking up the assigned and activated security token and its unique token identification in the user profile to identify the token type and the associated token domain of the assigned and activated security token; invoking an authentication plug-in particular to the identified token type to connect to the associated token domain based on the identification of the associated token domain in the user profile; and authenticating the assigned and activated security token with the associated token domain as connected to by the authentication plug-in.

BRIEF DESCRIPTION OF THE DRAWINGS

Embodiments are illustrated by way of example and not limited in the following figure(s), in which like numerals indicate like elements, in which.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the embodiments.

System

Figure 1:
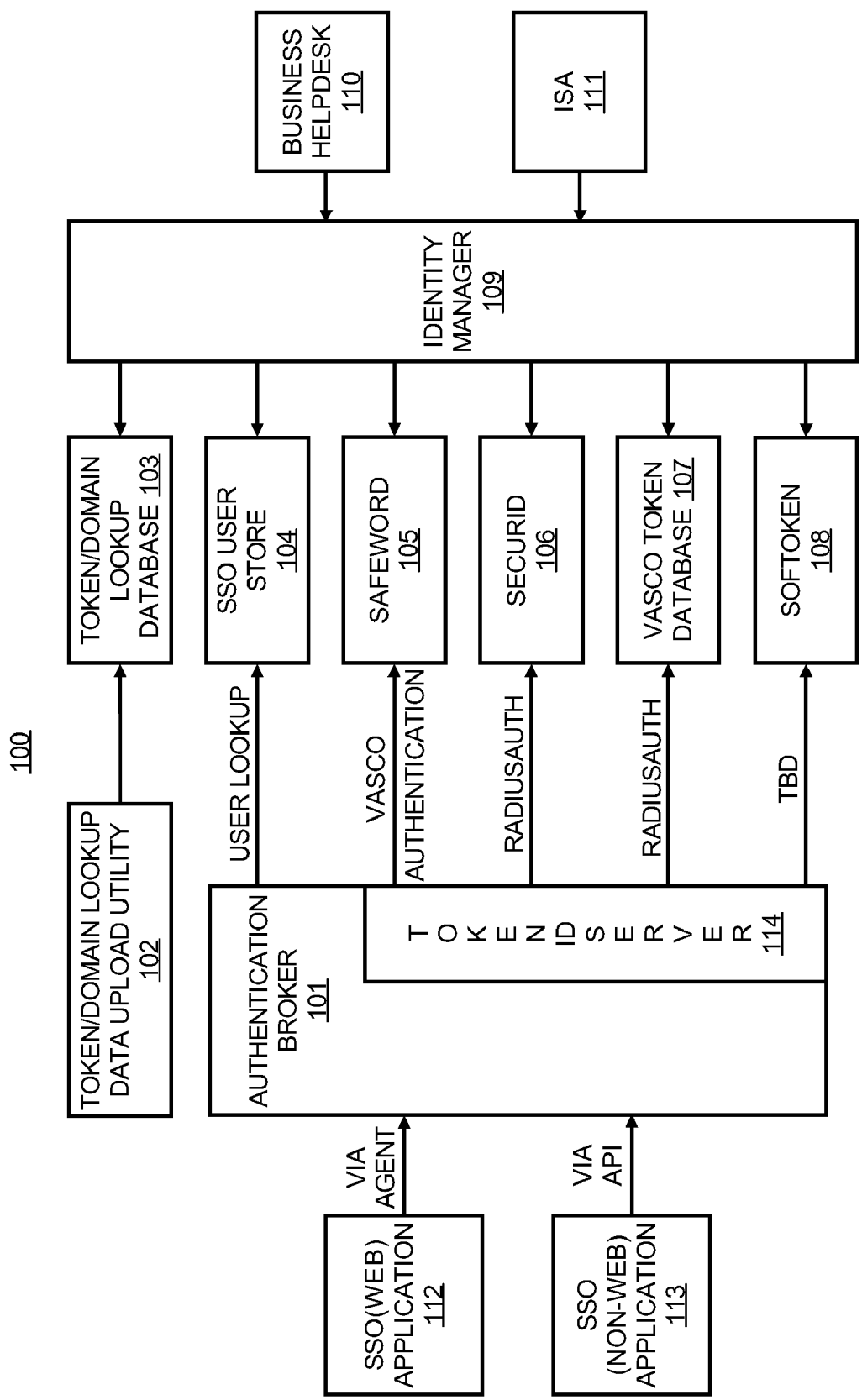
FIG. 1 illustrates an architecture of a token system 100 for centralizing and standardizing the implementation of security tokens for authorized users to access one or more business applications in an enterprise, in accordance with one embodiment.

FIG. 1 illustrates an architecture of a token system 100 for centralizing and standardizing the implementation of security tokens for authorized users to access one or more business applications in an enterprise, in accordance with one embodiment. The token system 100 enables each authorized user to select one of multiple available types of security token and use the selected single token to access different applications across an enterprise, in accordance with one embodiment. The system architecture 100 includes an authentication broker 101, a single sign-on (SSO) user store database 104, an identity manager 109, a token/domain lookup database 103, a token/domain lookup data upload utility 102, and a plurality of backend token servers and/or token databases implemented as backend token domains 105-108 for supporting different types of security token from which an authorized user may select. For example, as illustrated, the token system 100 includes a Safeword™ server implementing a first backend token domain 105, a SecurID™ server implementing a second backend token domain 106, a VASCO™ database implementing a third backend token domain 107, and a software token server implementing a fourth backend token domain 108. Although only two token servers and a token database are illustrated in FIG. 1, it should be understood that any number of token servers and token databases may be employed in the token system 100 as backend token domains because each token type may be supported by one or more multiple backend token domains. The various components of the token system 100 may be implemented by servers mainframe computers, desktop or workstation computers, or other computing machines with programming capabilities as known in the art, and they are now described.

The authentication broker 101 is customer-facing. It is operable to receive, through its centralized and standardized authentication interface, authentication requests from business applications across the enterprise and to forward such requests to appropriate backend token domains 105-108 for authentication. An authorization request is generated when a user requests to access one of the business applications. The authorization request may be sent to the authentication broker via a software agent of a single sign-on (SSO) authentication application 112. Alternatively, the authorization request may be sent to the authentication broker via an API call from an SSO authentication application 113. For example, the user interacts with such SSO authentication application (112 or 113), which may be a web-based application implemented on a client machine, such as a client computer that can make calls to the authentication broker 101 to gain access to one or more applications across the enterprise with a single token. The SSO authentication application 112 or 113 may be a standalone application or embedded in a business application which the user requests to access. Although not illustrated in FIG. 1, the SSO authentication applications 112 and 113 also may be connected to the authentication broker via a public data network, such as the Internet, or a private data network, such as an intranet. Further details of the authentication broker 101 are described later with reference to FIG. 2.

The SSO user store database 104 stores user profiles that include user data such as user identification (user ID or UID), personal identification number (PIN), token serial number (or any other unique token identification), token type, and token domain name that were configured through a pre-binding or post-binding token registration process. A unique user profile is maintained in the SSO user store database 104 for each user authorized to access one or more business applications of the enterprise. The user profile includes a UID that is unique across the entire SSO user store database 104, regardless of the token type the user has. The UID is used for identification and tracking of the user within the token system 100. This is to avoid the need for extensive changes to a user's data if a token is lost or replaced. Each UID has a corresponding token with a token serial number that is uniquely mapped to the UID. Thus, each user profile includes multi-valued attributes for storing token and application access information such as token type, token serial number, and token domain. A token may be shared by multiple applications across the same or different business units in the enterprise. Each business unit in the enterprise, via its business helpdesk 110, may disable a user from accessing its application, but it cannot remove the user profile from the SSO user store database 101.

A user may be permitted to use the token serial number as a username. Alternatively, enterprise business units may desire their users to use alphanumeric usernames rather than token serial numbers to log into their sites. These usernames may be of different formats, but they are mapped to the user's unique token serial number and UID. Furthermore, a user may have multiple usernames. This may occur if a user happens to be a customer of multiple business units, and each business unit may use a different login ID for the same user. Each username only may be mapped to one token and one associated UID. However, a token and its associated UID may be mapped or linked to multiple usernames.

The SSO user store database 104 may be implemented with lightweight directory access protocol (LDAP) for querying and modifying data directories therein. For example, the SSO user store database 104 utilizes three LDAP object classes to store SSO user and token information. The first LDAP object class is a structural object class that is used to store basic user information, such as the UID attribute and the user's personal information (home phone, home address, picture ID, department number, office number, etc.). The second LDAP object class is an auxiliary object class used to store SSO user information, such as login ID and password history of the user. The third LDAP object class is a structural object class used to store the user's token information, such as the token serial number, the token type, and the token domain to which the token belongs.

The token/domain lookup database 103 is operable to store token-to-domain mapping information, which is needed when there are multiple domains of the same token type to provide scalability to the token system 100. Without the token/domain mapping information, customers would need to provide token type and token domain name information when registering tokens, which is impractical and burdensome on the users. With the token/domain mapping information stored in a database 103, users merely provides token serial number information when registering tokens. A token/domain lookup data upload utility 102 is used to upload token/domain mapping information to the token/domain lookup database 103.

The identity manager 109 serves as a token management interface (TAMIN) that is accessible by the business helpdesks 110 (e.g., one helpdesk per business unit) and the ISA 111 to administer authorized users and their tokens. In one embodiment, an administrator in the ISA 111 has the authority to enable (or assign) or disable (or unassign) a user's token via the identity manager 109 if the user has been given access to multiple applications of multiple business units, to create a user profile, to modify a user profile, to delete a user profile, to create business applications for business units, to assign application owners (e.g., business unit) to business applications, to upload the token serial numbers and token domain association, to grant user access to a business application, and to revoke user access from a business application. Whereas, a business helpdesk administrator of a business unit is authorized to create user profiles in any desired SSO LDAP and associate the profile to any token domain, to link and unlink token, to modify or delete a user profile if such profile has access to only those business applications in the business unit with which the business help desk is associated, and to grant or revoke access to those business applications in the associated business unit (e.g., lock, unlock, enable, and disable user accounts). However, a business helpdesk administrator cannot modify or delete a user profile if the associated user has access to applications in more than one business units. Thus, the TAMIN application includes a set of APIs that facilitate the above functions by the business helpdesks 110 and ISA 111.

As illustrated in FIG. 1, the identity manager 109 interacts with the token/domain lookup database 103, the SSO user store database 104, and the plurality of backend token domains 105-108. It is operable to retrieve the token type and token domain information from the token/domain lookup database 103 so as to register and administer users that are authorized to access the business applications in the enterprise. In one embodiment, the identity manager 109 may be implemented as a web-based application that employs various LDAP and database tables to store token/domain mapping information and audit log information. For identity manager server access, SSO user ID and password may be used by business helpdesk and ISA administrators to establish HTTPS to secure the connection between their remote web browsers and the identity manager server to log into the TAMIN application therein.

When registering a new user, the identity manager 109 retrieves or looks up the token type and token domain information from the token/domain lookup database 103 and creates a user profile for each user in the SSO user store database 104. It then administers each user by unlocking the corresponding backend token domain (105-108) for the user's token. An administrator from a business helpdesk 110 may modify or delete user profiles when the users associated with such profiles are limited to access only those applications that belong to the associated business unit. If the user profile has additional access to any other application that belongs to another business unit, user profile updates are carried out by the ISA, who has the authority to create and modify all user profiles.

The backend token domains 105-108 enable the token system 100 to support various token types. Thus, the backend token domains 105-108 are operable for processing authentication requests forwarded by the authentication broker 101. Authentication results or statuses (pass or fail) may be returned back to the authentication broker 101. Additional token domains may be set up depending on user demand. In one embodiment, for continuity-of-business purpose, each token domain may be configured to have at least two servers so if the primary server fails, the secondary or backup server may step in to provide authentication service to end users. For applications that desire better performance or high availability, additional server may be added to a token domain.

The first backend token server 105 is operable for authenticating users that have a first type of security token. For example, the first token server may be a Safeword™ server operable for authenticating Safeword™ users. There may be multiple Safeword™ domains, and each Safeword™ domain may have multiple Safeword™ servers to provide scalability for token authentication. Each Safeword™ domain may have as many as 10 servers and support up to one million token users. Thus, additional token domain may be set up if more than one million Safeword™ users are in the SSO user store database.

Likewise, the second backend token server 106 is operable for authenticating users that have a second type of security token. For example, the second backend token server may be a SecurID™ server operable for authenticating SecurID™ users. There may be multiple SecurID™ domains, and each SecurID™ domain may have multiple SecurID™ servers to provide scalability for token authentication.

Certain token types, such as VASCO token, do not come with their own standalone infrastructures or administrative interfaces. Rather, the token user data may reside in a LDAP store, such as the VASCO token database 107, accessed via a security infrastructure that supports SSO authentication, as provided by one or more other components in the token system 100. Thus, in one embodiment, the administrative interface for such token type includes a web application that provides a web-based graphical user interface (GUI) to administrators (e.g., business desk and ISA administrators), with backend communication using LDAP for token management functions. For example, the authentication broker 101 may be employed as the authentication interface for VASCO users, and the identity manager 109 or another web-based service platform may be used as the administrative interface to administer VASCO users, with LDAP for the VASCO token database 107 and the VASCO users. The VASCO (LDAP) token database 107 serves as a backend VASCO token domain that is operable to store VASCO user and token information, with a SSO policy server 216 (FIG. 2) in the authentication broker 101 acting as the authentication front-end or interface. The identity manager 109 may be employed as a user registration server to register users in the SSO user store database 104 as VASCO users.

A VASCO administration server (not shown) may be employed to interact with the VASCO database 107 in order to administer VASCO users, such as assigning a VASCO token to a user. When registering a VASCO user, the identity manager 109 first retrieves the token type and token domain name information from the token/domain mapping LDAP based on the token serial number provided by the user. The identity manager 109 then creates the user entry in the SSO user LDAP and stores the token serial number, token type, and token domain name information in the user entry in the VASCO token database 107. All VASCO data stored in the VASCO token database 107 may be encrypted, and administrative access to the identity manager 109 for user registration and to the VASCO administration server for administering users may be protected using HTTPS/SSL with SSO authentication. Again, there may be multiple token databases in the token system 100.

Figure 2:
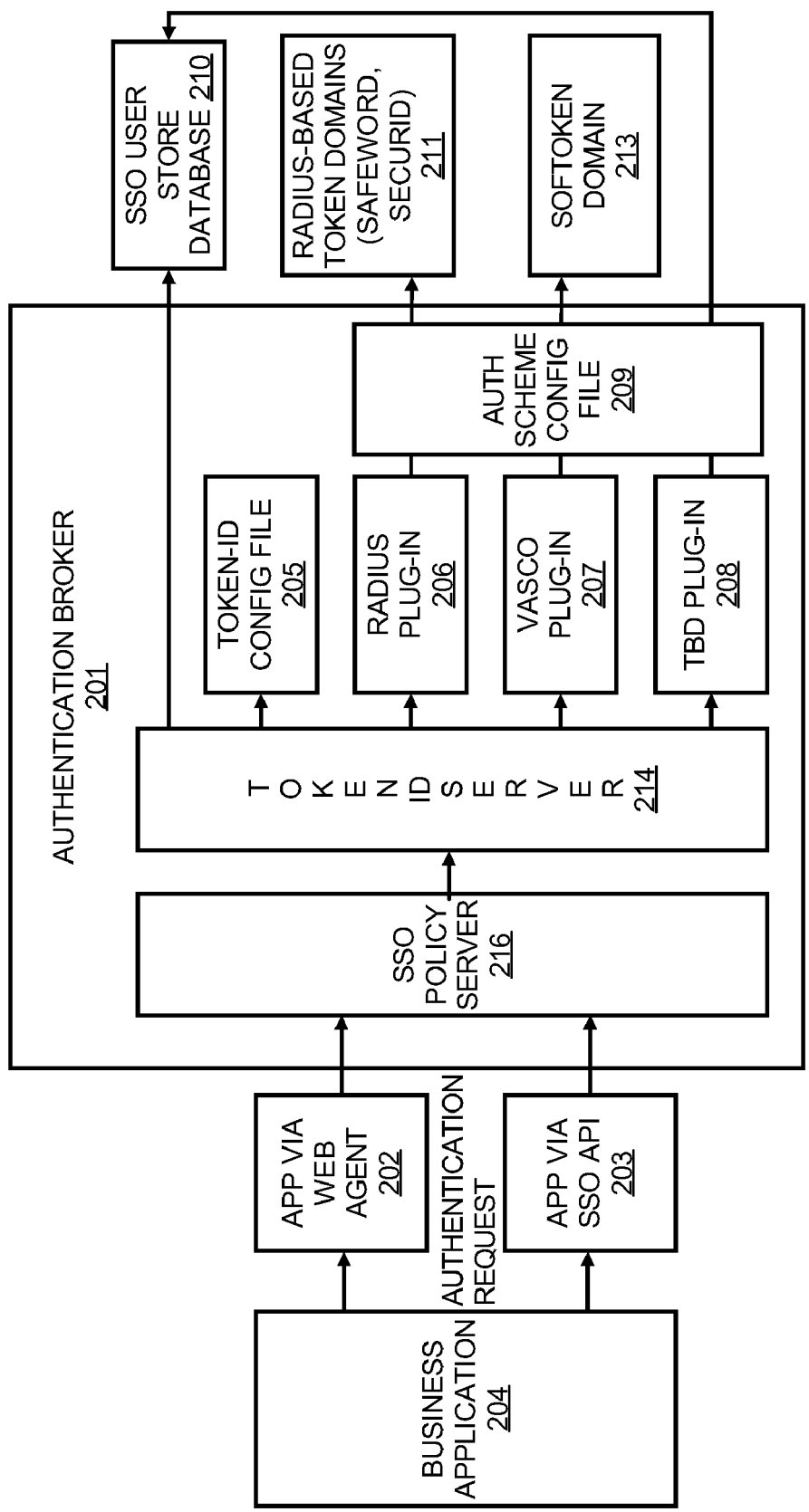
FIG. 2 illustrates a detailed architecture of an authentication broker, in accordance with one embodiment.

FIG. 2 illustrates a detailed architecture of the authentication broker 101, in accordance with one embodiment. The authentication broker includes a token identification (token-ID) server 214, a token-ID configuration file 205, a SSO policy server 216, and a plurality of authentication plug-ins 206-208 for the different types of token offered by the enterprise and supported by its token system 100. The token-ID server 214 is a security component that supports SSO authentication, as noted earlier, by forwarding authentication requests to authentication components that are external to the authentication broker 101 for authentication. Thus, in one embodiment, the token-ID server 214 is operable to receive authentication requests as provided by the SSO policy server 216 so as to determine user token types used for the authentication requests and associated backend token domain names to be used by looking up the SSO user store database 104. Based on the token type and backend token domain name returned by the SSO user store database 104, the token-ID server 214 invokes the proper authentication plug-in (206-208) to access the proper backend token domains (or servers). To do this, the token-ID server 214 accesses the token-ID configuration file 205 to configure initial settings for invoking the proper authentication plug-in. For example, if the type of token used by a user for access authentication is Safeword™ or SecurID™, the token-ID server 214 invokes a plug-in 206 which may be a remote authentication dial in user service (RADIUS) plug-in to access one of the back-end RADIUS-based token domains 211. In another example, if the user's token type is a VASCO™, it invokes the VASCO™ authentication plug-in 207 to access a VASCO™ token domain (not shown). In still another example, if the user's token type is a software security token, it invokes a software security token plug-in, as represented by the to-be-determined (TBD) plug-in 208, to access a softoken domain 213. FIG. 2 illustrates the TBD plug-in 208 to indicate that any token type may be supported by the authentication broker 101 and token system 100 so long as there is a corresponding plug-in and backend token domain to support such a token type. Each authentication plug-in (206-208) may access the authentication scheme configuration file 209 to configure initial settings for further accessing a corresponding backend token domain or server (211-213) for authentication. Accordingly, the authentication plug-ins 206-208 are operable to determine the token domain for its respective token type and connect to the proper backend token domain or server for authentication.

The SSO policy server 216 acts as an authentication interface and stores user-specific security policies such as user authentication mechanisms (static or OTP) and uniform resource locator (URL) authorization. These policies are set by the administrator of the authentication broker 101 who may be an IT administrator of the enterprise that hosts or maintains the token system 100.

Process

Figure 3A:
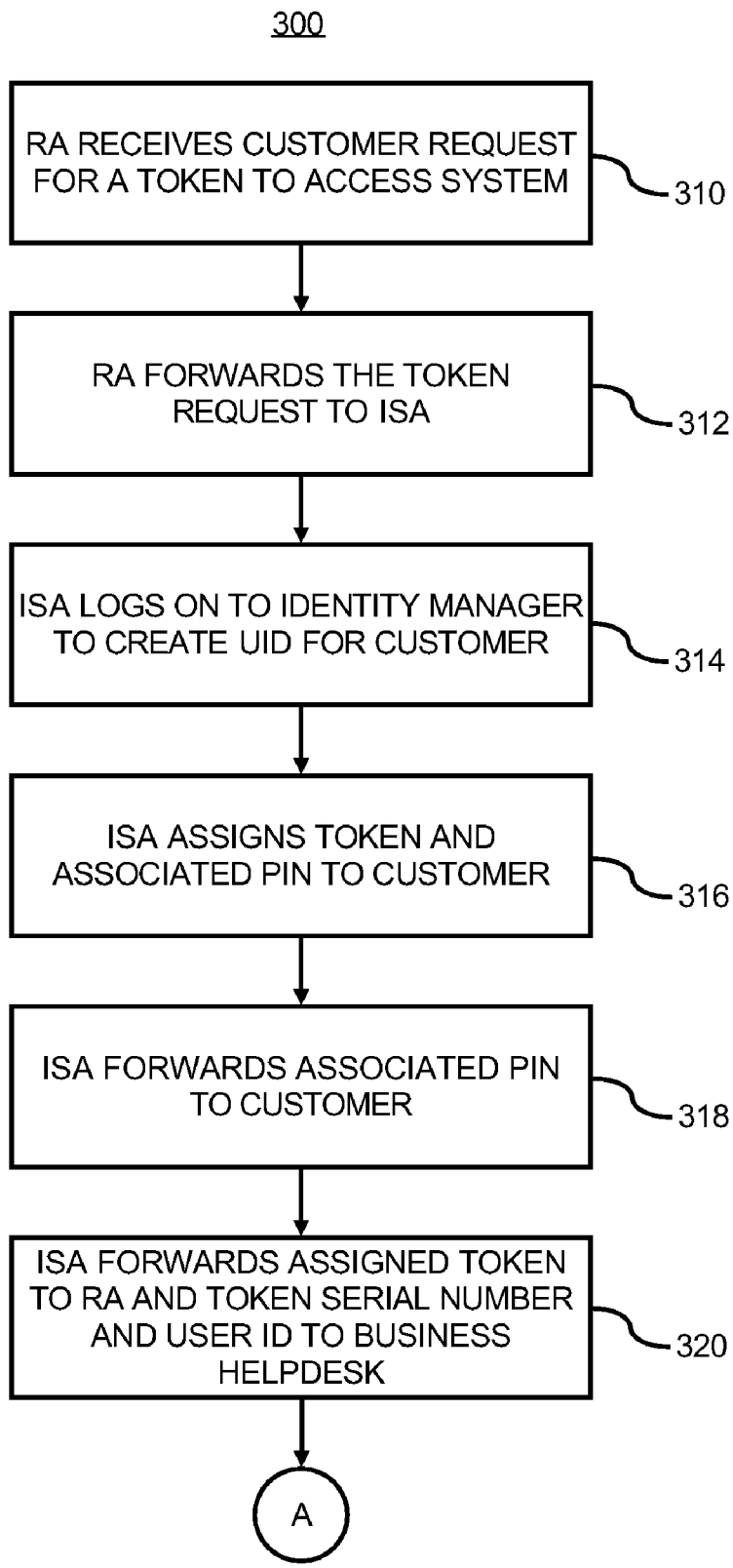
FIGS. 3A-B illustrate a pre-binding user registration process with the use of a token management interface for centralizing and standardizing implementation of security tokens, in accordance with one embodiment.
Figure 3B:
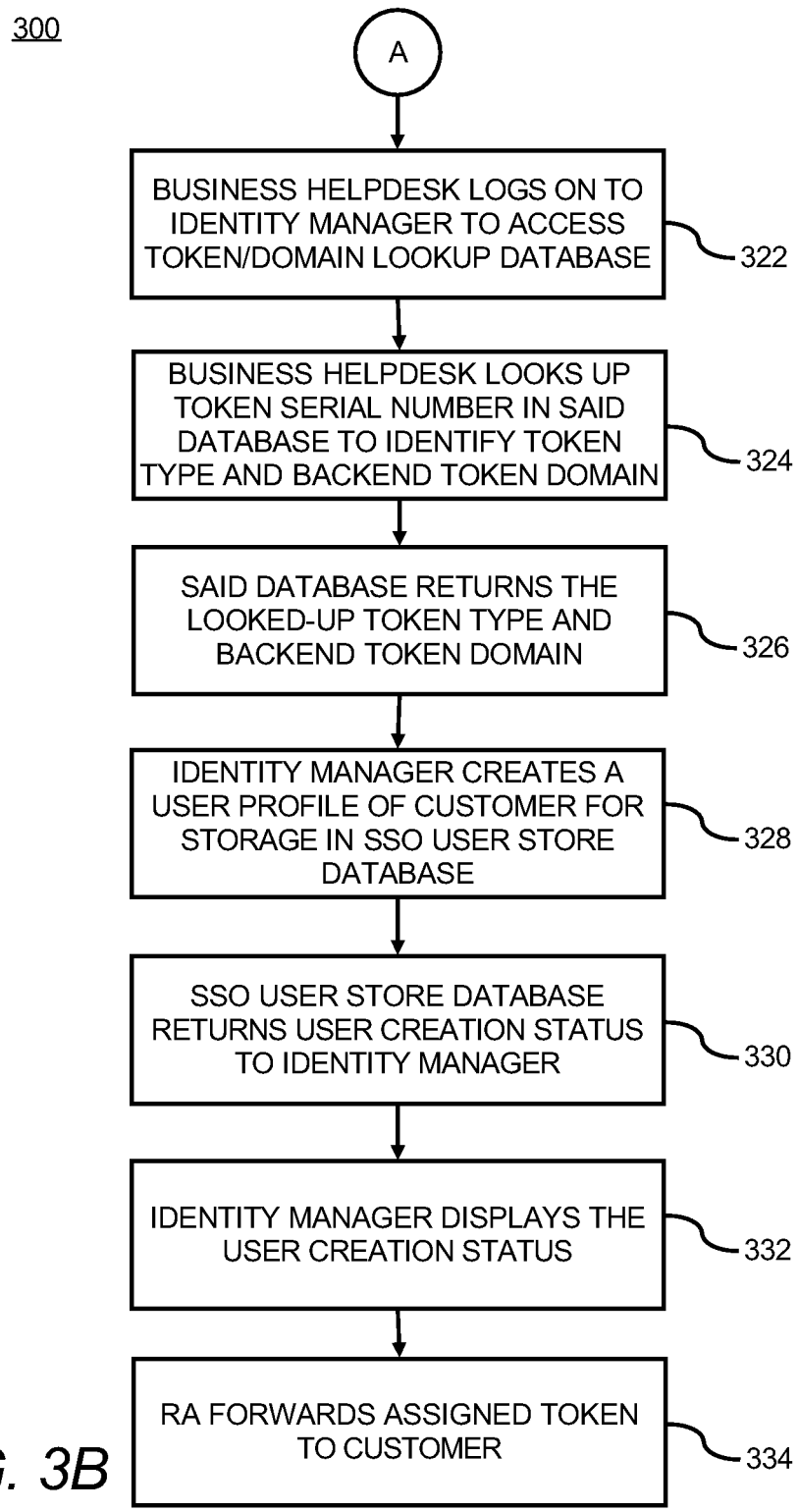

FIGS. 3A-B illustrates a pre-binding user registration process 300 with the use of a TAMIN for centralizing and standardizing implementation of security tokens, in accordance with one embodiment. The pre-binding registration process allows a token to be pre-assigned to a user ID (UID) of the customer before the token is forwarded to the customer. For illustrative purposes only and not to be limiting thereof, the process 300 is discussed in the context of the token system 100 illustrated FIGS. 1 and 2.

At 310, a registration agent (RA) of the enterprise receives a request, for example, from a customer for a token to access a business application hosted or provided by the enterprise. As part of the request, the customer may provide the RA with personal information such as name, address, home phone number, picture ID, and department number and office number (e.g., if customer is an employee of the enterprise). The RA may be a customer representative of the enterprise. The customer may make the token request remotely or in person to the RA at one of the enterprise's designated location. For example, if the enterprise is a financial institution such as a bank, the customer may request a token at a bank's branch office, where a RA may assist the customer with the request. Alternatively, the customer may remotely make a phone call to a number designated by the enterprise to request the token or use a web browser to remotely access a web site designated by the enterprise to request the token. Multiple RA's may be employed by the enterprise to handle token requests from enterprise customers.

At 312, the RA forwards the token request to an ISA 111, which may be centrally located to receive token requests forwarded by all RA's of the enterprise. The RA may forward the token request to the ISA 111 internally within the enterprise, via internal paper mail, e-mail, or other electronic messaging in a manner known in the art.

At 314, in response to the token request from the customer, the ISA 111 creates a UID for the customer that is unique across the entire SSO user store database 104. The ISA 111 creates the UID by logging on to the identity manager 109, which acts as a token management interface (TAMIN) with APIs that are accessible by the ISA 111 for administering authorized users and tokens.

At 316, the ISA 111 also uses the identity manager or TAMIN 109 to assign and activate a token having a token serial number and an associated PIN to the customer. The customer is to use the token in conjunction with the associated PIN in order to access the requested business application. It should be noted that prior to the commencement of the user registration process 300, the ISA 111 employed the token/domain lookup data upload utility 102 to upload the token/domain mapping information to the token/domain lookup database 103. As noted earlier, the token/domain mapping information maps each token and its token serial number to the token type and backend token domain (105-108).

At 318, the ISA 111 mails or otherwise forwards the personal identification number (PIN) information directly to the customer.

At 320, the ISA 111 separately mails or otherwise forwards the assigned token to the RA. The ISA 111 also forwards the token serial number and associated UID information to a business helpdesk 110 that is associated with the requested business application.

At 322, an administrator or user at the business helpdesk 110 logs on to the identity manager 109 and uses the APIs thereof to gain access to the token/domain lookup database 103.

At 324, the helpdesk administrator looks up the token serial number in the database 103 to identify the associated token type and backend token domain information.

At 326, the token/domain lookup database 103 returns the looked-up information to the identity manager 109.

At 328, the identity manager 109, as directed by the helpdesk administrator, uses the looked-up information to create a customer's user profile for storage in the SSO user store database 104. As noted earlier, the user profile includes the UID and PIN created for the customer by the ISA 111, the token serial number of the token assigned to the customer, and the looked-up token type and backend token domain name.

At 330, the SSO user store database 104 returns a user creation status to the identity manager 109 to indicate a user profile has been created and saved.

At 332, the identity manager 109, as directed by the helpdesk administrator, may display the user creation status to the helpdesk administrator to provide notification of the creation of the user profile for the customer. In one embodiment, the identity manager or TAMIN 109 is operable to keep track of token statistics such as the number of active users, the number of users being locked, and the number of tokens being activated for each business unit. This enables the enterprise and its business units therein to generate token statistics reports.

At 334, referring back to 320, once the RA receives the assigned token from the ISA 111, it mails or otherwise forwards the token to the customer separately from the PIN mailing by the ISA 111. Thus, for added security, the assigned token and PIN are not mailed together to the customer. The customer now has both the PIN and token for multi-factor authentication (MFA) to access the enterprise's IT system. Alternative embodiments are contemplated wherein an authentication mechanism other than PIN may be assigned at 316 for MFA. As described above, to create a more customer-friendly service, the RA is tasked with mailing the assigned token to the customer because the RA has a closer bond with the customer. However, alternative embodiments are contemplated wherein the ISA may also mail out the assigned token, separately from the mailing of the PIN, to the customer.

It should be noted that steps 322-332 are performed by the business helpdesk 110 at a business unit to create a user profile because it is assumed that the customer's request for a token at 310 is for accessing one or more business applications provided by the business unit. However, if the customer's request at 310 is a for a token to access business applications in more than one business unit, a business helpdesk 110 at each business unit is not authorized to create, update, or otherwise modify a user profile having such a token. Instead, the ISA 111 is to perform the steps 322-332. Furthermore, it should be noted that some or all of the steps 312-318 may be performed by the business helpdesk 110 in lieu of the ISA 111, depending on how much access to the token database 104 the business helpdesk 110 is allowed to have. Also, it should be understood that the pre-binding registration process 300 may be automatically performed without any intervention by the RA, the business helpdesk 110, or the ISA 111 through appropriate programming for the RA, the business helpdesk 110, and the ISA 111.

Figure 4A:
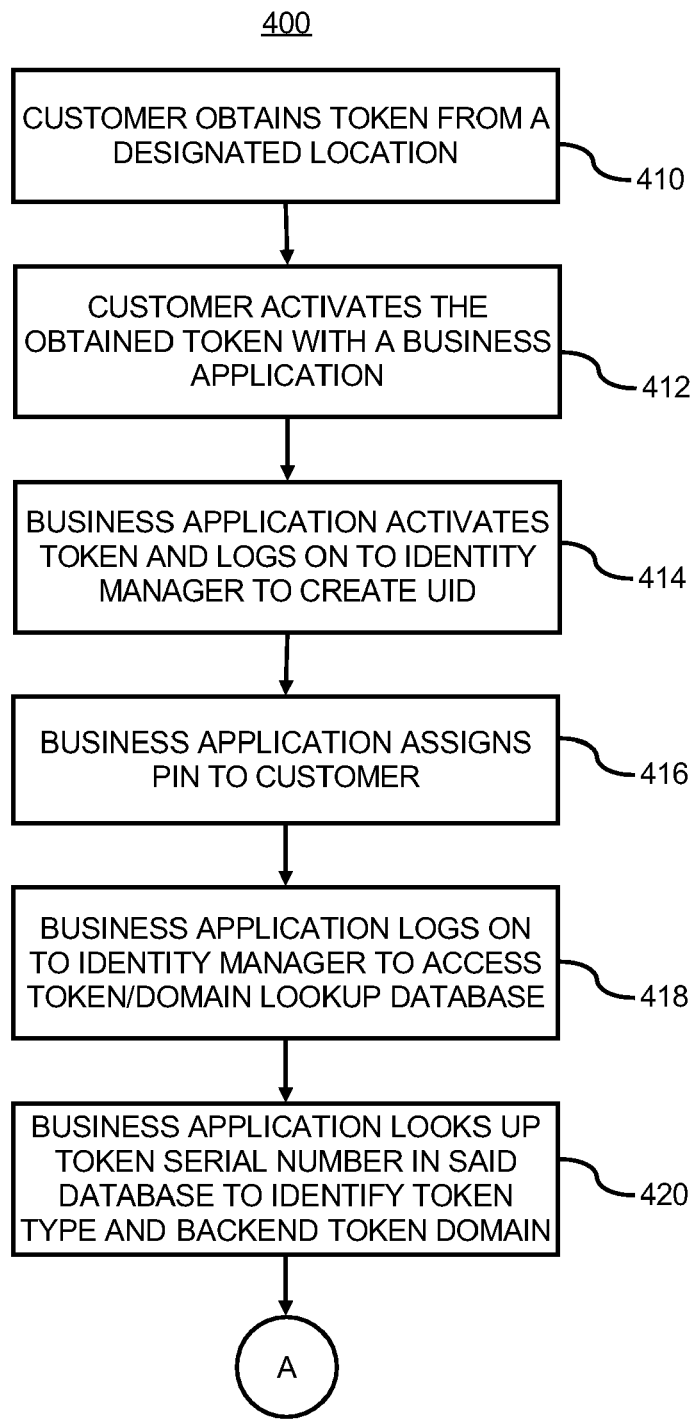
FIGS. 4A-B illustrate a post-binding user registration process with the use of a token management interface for centralizing and standardizing implementation of security tokens, in accordance with one embodiment.
Figure 4B:
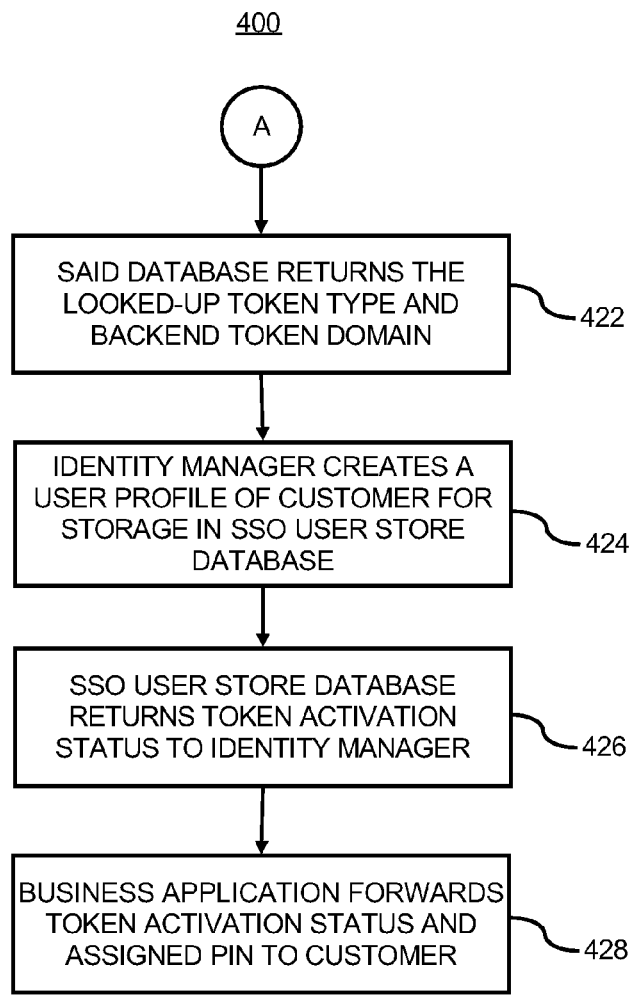

FIGS. 4A-B illustrates a post-binding user registration process 400 with the use of a TAMIN for centralizing and standardizing implementation of security tokens, in accordance with one embodiment. The post-binding registration process allows a customer to receive a token and subsequently register that token with a UID of the customer. This process is efficient for massive deployment of tokens to multiple customers. For illustrative purposes only and not to be limiting thereof, the process 400 is discussed in the context of the token system 100 illustrated FIGS. 1 and 2.

At 410, a customer wishing to access one or more business applications (e.g., business application 204 in FIG. 2) in the enterprise may pick up or otherwise obtain a token from a location designated by the enterprise. For example, if the enterprise is a financial institution such as a bank, it may designate one or more of its local bank branches as a location to pick up a token. As a condition for obtaining the token, the customer may provide the enterprise with personal information such as name, address, home phone number, picture ID, and department number and office number (e.g., if customer is an employee of the enterprise).

At 412, once the customer has possession of the token, the customer may remotely activate the token for use by a software application, such as a web-based application, that interacts with a business application that the customer desires to access with the obtained token.

At 414, the business application activates the token for the customer and logs on to the identity manager 109, which acts as a TAMIN with APIs that are accessible by the business application for administering authorized users and tokens. The business application uses the identity manager or TAMIN 109 to create a UID for the customer that is unique across the entire SSO user store database 104.

At 416, the business application also uses the identity manager or TAMIN 109, via the APIs provided by the later, to assign a PIN to the customer. The customer is to use the obtained token in conjunction with the associated PIN in order to access the business application, which is desired by the customer. Alternative embodiments are contemplated wherein an authentication mechanism other than PIN may be assigned here for MFA.

At 418, the business application logs on to the identity manager 109 and uses the APIs thereof to gain access to the token/domain lookup database 103.

At 420, the business application looks up the token serial number of the token obtained by the customer in the database 103 to identify the associated token type and backend token domain information. It should be noted that prior to the commencement of the user registration process 400, the ISA 111 employed the token/domain lookup data upload utility 102 to upload the token/domain mapping information to the token/domain lookup database 103. As noted earlier, the token/domain mapping information maps each token and its token serial number to the token type and backend token domain (105-108).

At 422, the token/domain lookup database 103 returns the looked-up information to the identity manager 109.

At 424, the identity manager 109, as directed by the business application, uses the looked-up information to create a customer's user profile for storage in the SSO user store database 104. As noted earlier, the user profile includes the UID and PIN created for the customer by the business application, the token serial number of the token obtained by the customer, and the looked-up token type and backend token domain name.

At 426, the SSO user store database 104 returns a user creation status to the identity manager 109 to indicate a user profile has been created and saved. The SSO user store database 104 also returns the activation status of the token, for example, to indicate that the token has been activated, to the identity manager 109. In one embodiment, the identity manager or TAMIN 109 is operable to keep track of token statistics such as the number of active users, the number of users being locked, and the number of tokens being activated for each business unit. This enables the enterprise and its business units therein to generate token statistics reports.

At 428, the business application retrieves the token activation status and forwards it along with the assigned PIN to the customer. Thus, the customer now has an activated token and a PIN for multi-factor authentication to access a business application.

It should be noted that steps 412-428 are performed by a business application at a business unit to create a user profile because it is assumed that the customer's request for a token at 410 is for accessing one or more business applications provided by the same business unit. However, if the customer's token obtained at 410 is for accessing business applications in more than one business unit, a business application (or it business helpdesk at the associated business unit) is not authorized to create, update, or otherwise modify a user profile having such a token. Instead, the business application is replaced with the ISA 111 in steps 412-428. Also, it should be understood that actions automatically performed by the business application in the post-binding registration process 400 may be performed by an administrator at a business helpdesk that handles the business application for a business unit.

Figure 5A:
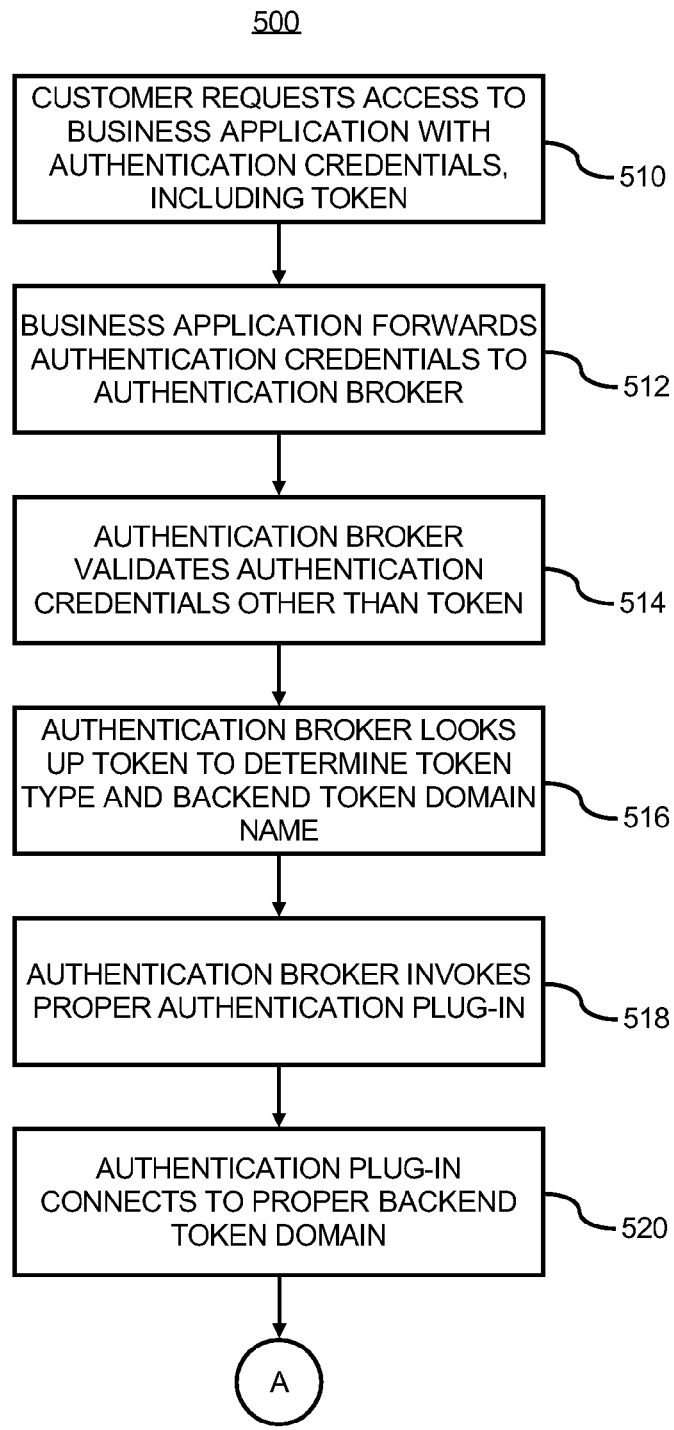
FIGS. 5A-B illustrate a process for authenticating a user, such as a customer, that accesses an enterprise with a security token, in accordance with one embodiment.
Figure 5B:
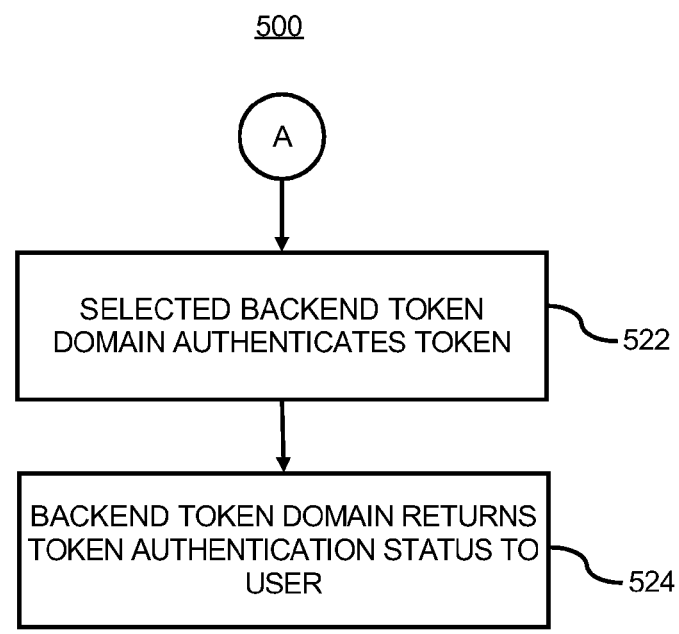

FIGS. 5A-B illustrate a process 500 for authenticating a user, such as a customer, that accesses an enterprise with a security token, in accordance with one embodiment. For illustrative purposes only and not to be limiting thereof, the process 500 is discussed in the context of the token system 100 illustrated FIGS. 1 and 2.

At 510, using a security token, the customer requests access to a business application by accessing an SSO authentication application (112 or 113) within a business application that the user wishes to access to enter authentication credentials such as a username, a PIN, and an OTP of a security token (along with the token serial number). As discussed earlier, the token may have been provided to the customer through a pre-binding or post-binding registration process.

At 512, once the SSO authentication application receives the user authentication credentials (which are included in the authentication requests), it forwards the credentials to the authentication broker 101, which includes a SSO policy server 216 acting as the authentication front-end or interface to receive the authentication credentials from the business application.

At 514, the SSO policy server 216 processes the authentication credentials to determine the validity of those credentials other than the security token based on predetermined user-specific SSO policies stored in the server 216. If the authentication credentials are valid, the server 216 forwards the entered security token (along with its token serial number) to the token-ID server 214. Otherwise, the server 216 rejects the access request and notifies the customer of the rejection.

At 516, the token-ID server 214 looks up the security token (and its token serial number) in the SSO user store database 104 to determine the token type and backend token domain name to be used for authenticating the token and its user.

At 518, based on the token type returned by the SSO user store database 104, the token-ID server 214 invokes the proper authentication plug-in (206-208). For example, if the type of token used by a user for access authentication is Safeword™ or SecurID™, the token-ID server 214 invokes a plug-in 206 which may be a remote authentication dial in user service (RADIUS) plug-in. If the user's token type is a VASCO™, it invokes the VASCO™ authentication plug-in 207.

At 520, based on the backend token domain name returned by the SSO user store database 104, the invoked authentication plug-in connects to the particular backend token domain. For example, the plug-in 206 connects to a SecurID™ domain 106. If there are more than one SecurID™ domain 106, the backend token domain name returned by the SSO user store database 104 enables the plug-in 206 to select the particular SecurID™ domain for connection thereto.

At 522, the selected backend token domain proceeds to authenticate the customer by authenticating the token serial number and OTP of the customer's token.

At 524, the backend token domain returns the authentication status (pass or fail) to the authentication plug-in, which passes such status on to business application (and SSO authentication application therein) to the customer to indicate whether authentication is successful so that the customer can access the desired business application.

Figure 6:
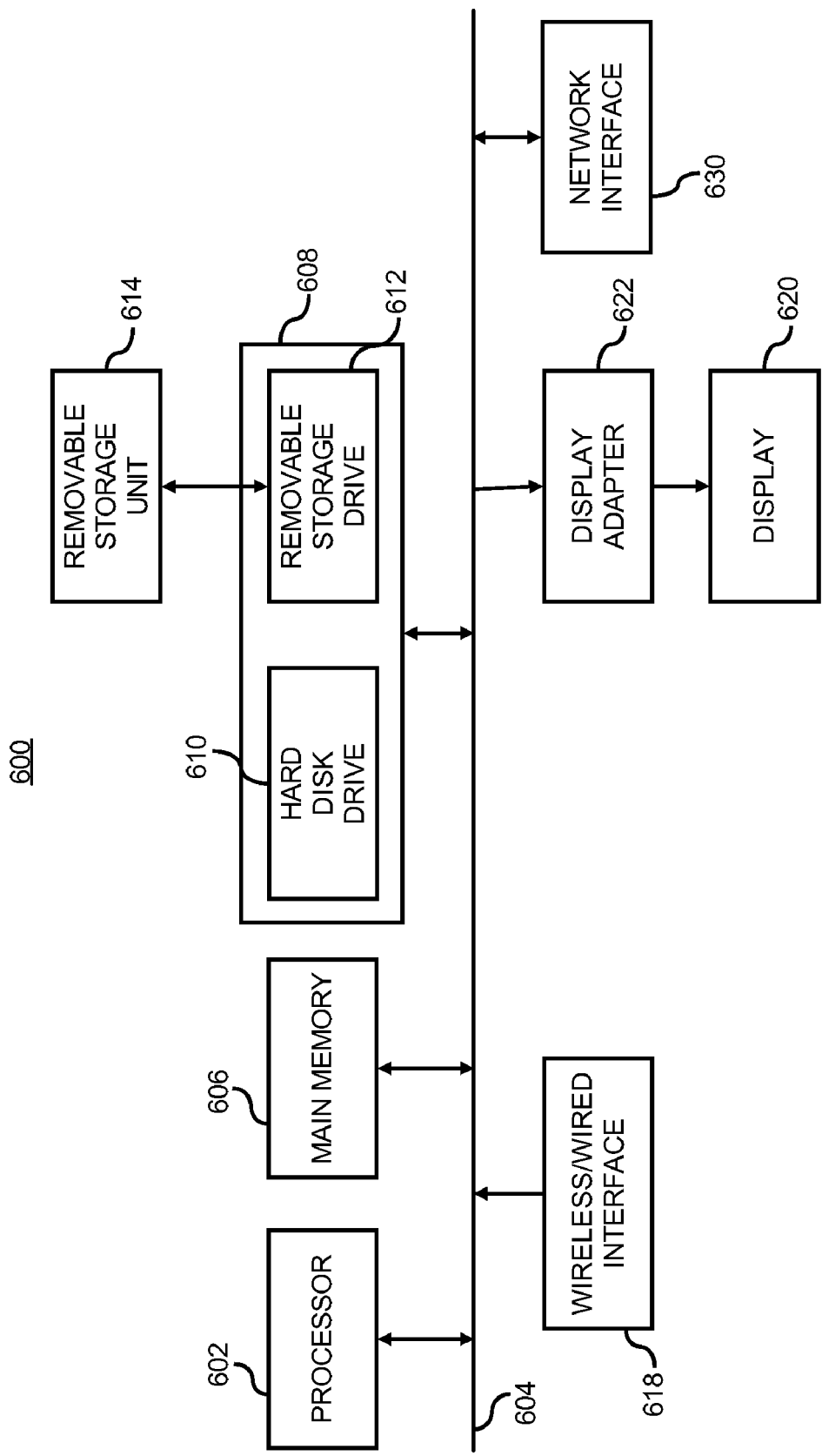
FIG. 6 illustrates a block diagram of a computerized system that is operable to be used as a platform for implementing the token system of FIG. 1 or one or more components therein.

FIG. 6 illustrates a block diagram of a computerized system 600 that is operable to be used as a platform for implementing the token system 100, or one or more components therein (such as broker 101 or components therein, databases 103-108 and computing machines at business helpdesk 110 and ISA 111), and processes 300-500 described above. The computerized system 600 includes one or more processors, such as processor 602, providing an execution platform for executing software. Thus, the computerized system 600 includes one or more single-core or multi-core processors of any of a number of computer processors, such as processors from Intel, AMD, and Cyrix. As referred herein, a computer processor may be a general-purpose processor, such as a central processing unit (CPU) or any other multi-purpose processor or microprocessor. A computer processor also may be a special-purpose processor, such as a graphics processing unit (GPU), an audio processor, a digital signal processor, or another processor dedicated for one or more processing purposes. Commands and data from the processor 602 are communicated over a communication bus 204 or through point-to-point links with other components in the computer system 200.

The computer system 200 also includes a main memory 206 where software is resident during runtime, and a secondary memory 208. The secondary memory 208 may also be a computer-readable medium (CRM) that may be used to store software programs, applications, or modules that implement the processes 300-500, plug-ins 206-208, and configuration files 205 and 209. The main memory 206 and secondary memory 208 (and an optional removable storage unit 214) each includes, for example, a hard disk drive and/or a removable storage drive 212 representing a floppy diskette drive, a magnetic tape drive, a compact disk drive, etc., or a nonvolatile memory where a copy of the software is stored. In one example, the secondary memory 408 also includes ROM (read only memory), EPROM (erasable, programmable ROM), EEPROM (electrically erasable, programmable ROM), or any other electronic, optical, magnetic, or other storage or transmission device capable of providing a processor or processing unit with computer-readable instructions.

The computer system 200 includes a display 220 connected via a display adapter 222, user interfaces comprising one or more input devices 218, such as a keyboard, a mouse, a stylus, and the like. However, the input devices 218 and the display 220 are optional. A network interface 230 is provided for communicating with other computer systems via, for example, a network.

Accordingly, the token systems and methods as described herein for centralizing and standardizing the implementation of security tokens for user authentication do not impact existing customer login experience. Thus, they may be implemented into an existing IT system of an enterprise in a manner transparent to the enterprise customers to provide token authentication, using familiar tokens that the customers already possess. Furthermore, the various token solutions described herein provide the enterprise with the flexibility and scalability to adapt new token products and technologies, increase the number of authorized users by increasing the number of backend token domains, enable each enterprise customer to use only one token to access business applications across the enterprise to improve customer experience and service. Business application development cycle is also shortened because they may be securely protected with a security token through implementation of a SSO authentication application, such as a SSO web agent, therein.

What has been described and illustrated herein are various embodiments along with some of their variations. The terms, descriptions and figures used herein are set forth by way of illustration only and are not meant as limitations. Those skilled in the art will recognize that many variations are possible within the spirit and scope of the subject matter, which is intended to be defined by the following claims—and their equivalents—in which all terms are meant in their broadest reasonable sense unless otherwise indicated.

What is claimed is:

1. A system for authenticating a security token provided to request access to at least one business application in an enterprise including a plurality of business units, comprising:
   a processor coupled to memory and programmed for:
      receiving a request for the security token for authenticating the request to access the at least one business application of a plurality of business applications, each business application being managed by a different one of the plurality of business units, and the plurality of business units being provided with access to a token domain interface (TAMIN);
      creating, via accessing the TAMIN, a unique user identification (UID) for the security-token request;
      assigning and activating, via accessing the TAMIN, the security token in response to the security-token request, the security token being identified by a unique token identification;
      storing in a lookup database a mapping of security tokens to token types and a plurality of token domains, each of said token domains operating to authenticate a type of security token;
      storing in a user store database a user profile that includes the UID, the assigned and activated security token, a token type of the assigned and activated security token as provided by the mapping in the lookup database, and a corresponding one of the token domains as also provided by the mapping in the lookup database;
      receiving by an authentication broker the assigned and activated security token from the at least one business application;
      looking up, via accessing the TAMIN, the assigned and activated security token and its unique token identification in the user profile stored in the user store database to identify the token type and the corresponding token domain of the assigned and activated security token so as to authenticate the assigned and activated security token; and
      preventing one of the plurality of business units to perform, via accessing the TAMIN, the steps of creating the UID, assigning the security token, and looking up the assigned and activated security token upon a determination that the assigned security token is used for authentication access to multiple business applications in different ones of the plurality of business units.

2. The system of claim 1, wherein the at least one business application includes a single sign-on (SSO) authentication application that operates to receive the assigned and activated security token and to forward the assigned and activated security token to the authentication broker.

3. The system of claim 2, wherein the processor is further programmed for receiving, via a security policy server of the authentication broker, the assigned and activated security token and to validate the assigned and activated security token before looking up the assigned and activated security token in the user profile stored in the user store database.

4. The system of claim 3, wherein the processor is further programmed for receiving, via a token-identification server of the authentication broker, the validated security token from the security policy server and to look up the assigned and activated security token in the user profile stored in the user store database.

5. The system of claim 4, wherein the:
processor is further programmed for accessing a token-identification configuration file of the authentication broker by the token identification server to configure settings for accessing one or more authentication plug-ins; and
for accessing an authentication-scheme configuration file of the authentication broker by the one or more authentication plug-ins to configure settings for accessing one or more token domains external to the authentication broker that are used to authenticate different types of security tokens.

6. The system of claim 1, wherein the assigned and activated security token is one of a hardware security token and a software security token that provide one-time password (OTP) authentication.

7. The system of claim 1, wherein the authentication broker includes a plurality of authentication plug-ins, each authentication plug-in connects to one of the plurality of token domains that authenticates a different type of security token.

8. The system of claim 7, wherein at least one of the authentication plug-ins is a remote authentication dial in user service (RADIUS) based plug-in.

9. The system of claim 7, wherein at least one of the authentication plug-ins is a plug-in that provides connection to one of the plurality of token domains for authenticating a software security token.

10. A method for authenticating a request to access at least one business application in an enterprise including a plurality of business units, comprising:
receiving a request for a security token for authenticating the request to access the at least one business application of a plurality of business applications, each business application being managed by a different one of the plurality of business units, and the plurality of business units being provided with access to a token domain interface (TAMIN);
creating, via accessing the TAMIN, a unique user identification (UID) for the security-token request;
assigning and activating, via accessing the TAMIN, a security token in response to the security-token request, the security token is identified by a unique token identification;
looking up, via accessing the TAMIN, the assigned and activated security token and its unique token identification to identify a token type of the assigned and activated security token and an associated token domain for authenticating the assigned and activated security token;
storing the UID, the unique token identification, the identified token type, and an identification of the associated token domain in a user profile;
receiving the request to access the at least one business application, wherein the request includes the assigned and activated security token;
responsive to the request to access, looking up the assigned and activated security token and its unique token identification in the user profile to identify the token type and the associated token domain of the assigned and activated security token;
invoking an authentication plug-in particular to the identified token type to connect to the associated token domain based on the identification of the associated token domain in the user profile;
authenticating the assigned and activated security token with the associated token domain as connected to by the authentication plug-in; and
preventing one of the plurality of business units to perform, via accessing the TAMIN, the steps of creating the UID, assigning the security token, and looking up the assigned and activated security token upon a determination that the assigned and activated security token is used for authentication access to multiple business applications in different ones of the plurality of business units.

11. The method of claim 10, further comprising:
assigning a personal identification number (PIN) to the request to access the at least one business application to establish multi-factor authentication to access the at least one business application with the PIN and the assigned and activated security token.

12. The method of claim 10, further comprising:
providing a plurality of application programming interfaces (APIs) in the TAMIN for the at least one business application to access the TAMIN to perform the steps of creating the UID, assigning and activating the security token, and looking up the assigned and activated security token.

13. The method of claim 10, further comprising:
one of the plurality of business units accessing the TAMIN to perform the steps of creating the UID, assigning and activating the security token, and looking up the assigned and activated security token upon a determination that the assigned and activated security token is used for authenticating access to the business application managed by the one business unit and not in a business application managed by any other of the plurality of business units.

14. The method of claim 10, further comprising:
providing a centralized information security administration (ISA) in the enterprise to access the TAMIN and perform the steps of creating the UID, assigning the security, and looking up the assigned security token.

15. A method for authenticating a request to access at least one business application in an enterprise including a plurality of business units, comprising:
receiving a request for the security token for authenticating the request to access the at least one business application of a plurality of business applications, each business application being managed by a different one of a plurality of business units, and the plurality of business units being provided with access to a token domain interface (TAMIN);
creating, via accessing the TAMIN, a unique user identification (UID) for the security-token request;
assigning, via accessing the TAMIN, a security token in response to the security-token request, the security token being identified by a unique token identification;
receiving a request to activate the previously assigned security token for authenticating the request to access the at least one business application, the request includes a unique token identification of the previously assigned security token;
activating, via accessing the TAMIN, the previously assigned security token;
looking up, via accessing the TAMIN, the previously assigned and activated security token and its unique token identification to identify a token type of the previously assigned and activated security token and an associated token domain for authenticating the previously assigned and activated security token;

storing the UID, the unique token identification, the identified token type, and an identification of the associated token domain in a user profile;

receiving the request to access the at least one business application, wherein the request includes the previously assigned and activated security token;

responsive to the request to access, looking up, via accessing the TAMIN, the previously assigned and activated security token and its unique token identification in the user profile to identify the token type and the associated token domain of the previously assigned and activated security token;

invoking an authentication plug-in particular to the identified token type to connect to the associated token domain based on the identification of the associated token domain in the user profile;

authenticating the previously assigned and activated security token with the associated token domain as connected to by the authentication plug-in; and preventing one of the plurality of business units to perform, via accessing the TAMIN, the steps of creating the UID, assigning the security token, and looking up the assigned and activated security token upon a determination that the assigned and activated security token is used for authentication access to multiple business applications in different ones of the plurality of business units.

16. The method of claim 15, further comprising:

assigning an authentication mechanism to the request to access the at least one business application to establish multi-factor authentication to access the at least one business application with the authentication mechanism and the previously assigned and activated security token.

17. The method of claim 16, wherein in the step of receiving the request to access the at least one business application, the request further includes the assigned authentication mechanism, and the method further comprising:

authenticating the assigned authentication mechanism; and upon successfully authenticating the assigned authentication mechanism, proceeding to perform the step of looking up the previously assigned and activated security token and its unique token identification.

* * * * *